US012452987B2

(12) United States Patent
Bezel

(10) Patent No.: US 12,452,987 B2
(45) Date of Patent: Oct. 21, 2025

(54) HIGH-POWER COMPACT VUV LASER-SUSTAINED PLASMA LIGHT SOURCE

(71) Applicant: KLA Corporation, Milpitas, CA (US)

(72) Inventor: Ilya Bezel, Mountain View, CA (US)

(73) Assignee: KLA Corporation, Milpitas, CA (US)

( * ) Notice: Subject to any disclaimer, the term of this patent is extended or adjusted under 35 U.S.C. 154(b) by 92 days.

(21) Appl. No.: 18/438,025

(22) Filed: Feb. 9, 2024

(65) Prior Publication Data

US 2024/0274430 A1 Aug. 15, 2024

Related U.S. Application Data

(60) Provisional application No. 63/446,911, filed on Feb. 20, 2023, provisional application No. 63/445,307, filed on Feb. 14, 2023.

(51) Int. Cl.

*H05G 2/00* (2006.01)
*H01J 61/02* (2006.01)
(Continued)

(52) U.S. Cl.

CPC ........... *H05G 2/008* (2013.01); *H01J 61/025* (2013.01); *H01J 61/16* (2013.01); *H01J 61/26* (2013.01); *H01J 61/40* (2013.01); *H01J 65/04* (2013.01)

(58) Field of Classification Search

CPC ........ H05G 2/008; H01J 61/025; H01J 61/16; H01J 61/26; H01J 61/40; H01J 65/04
See application file for complete search history.

(56) References Cited

U.S. PATENT DOCUMENTS 5,608,526 A 3/1997 Piwonka-Corle et al.
5,999,310 A 12/1999 Shafer et al.
(Continued)

FOREIGN PATENT DOCUMENTS

EP 3357081 A1 8/2018
JP 2009532829 A 9/2009
(Continued)

OTHER PUBLICATIONS

Korean Intellectual Property Office, International Search Report and Written Opinion received in International Application No. PCT/US2024/015660, Jun. 12, 2024, 14 pages.
(Continued)

*Primary Examiner* — Adam D Houston
(74) *Attorney, Agent, or Firm* — Suiter Swantz IP

(57) ABSTRACT

A compact LSP broadband light includes a gas containment structure containing a mixture of a first noble gas and a second noble gas, a filter tube positioned within the gas containment structure, an input window, and a pump source. The laser pump source directs an optical pump through the input window to sustain a plasma within the filter tube. The first noble gas absorbs broadband light within a first and a second wavelength band. The filter tube absorbs broadband light having a wavelength below a selected threshold. The absorption of broadband light by the first noble gas and the filter tube provide long-pass filtering to protect one or more downstream optical elements. The gas containment structure includes an output optical window for transmission of filtered broadband light. The gas containment structure includes a gas inlet and outlet for generating a reverse vortex flow pattern within the filter tube.

35 Claims, 11 Drawing Sheets

(51) Int. Cl.

| | |
|---|---|
| ***H01J 61/16*** | (2006.01) |
| ***H01J 61/26*** | (2006.01) |
| ***H01J 61/40*** | (2006.01) |
| ***H01J 65/04*** | (2006.01) |

(56) References Cited

U.S. PATENT DOCUMENTS 6,297,880 B1 10/2001 Rosencwaig et al.
6,972,419 B2 * 12/2005 Tejnil .................. G03F 7/70158 359/361
7,050,149 B2 * 5/2006 Owa .................. G03F 7/70808 355/71
7,525,649 B1 4/2009 Leong et al.
7,598,509 B2 * 10/2009 Ershov ................. H05G 2/0086 250/492.2
7,957,066 B2 6/2011 Joseph et al.
8,259,771 B1 * 9/2012 Shchemelinin ......... H01J 61/54 372/55
8,643,840 B2 * 2/2014 Gross ................... G01N 21/211 372/76
9,476,841 B1 * 10/2016 Antsiferov .......... G03F 7/70033
9,927,094 B2 * 3/2018 Bezel ...................... H01J 61/34
10,690,589 B2 * 6/2020 Bezel .................... H01J 65/042
11,690,162 B2 * 6/2023 Bezel ...................... H01J 65/04 315/111.21
11,776,804 B2 10/2023 Bezel et al.
2007/0002465 A1 1/2007 Chuang et al.
2009/0032740 A1 * 2/2009 Smith ................. G03F 7/70033 250/503.1
2011/0181191 A1 * 7/2011 Smith .................. H05B 41/382 250/493.1
2011/0205529 A1 * 8/2011 Gross ...................... H01J 65/06 313/624
2013/0114085 A1 5/2013 Wang et al.
2013/0181595 A1 * 7/2013 Bezel ...................... H01J 61/14 313/112
2013/0234597 A1 9/2013 Kusunose et al.
2015/0021500 A1 * 1/2015 Smith .................. H05B 41/382 250/493.1
2015/0271905 A1 * 9/2015 Oh .......................... H01J 65/00 250/432 R
2017/0164457 A1 * 6/2017 Bezel ...................... H01J 61/52
2017/0278694 A1 * 9/2017 Chuang ................. H01J 61/302
2019/0033204 A1 1/2019 Bezel et al.
2021/0092826 A1 * 3/2021 Bezel ................ H01J 37/32339
2021/0231292 A1 7/2021 Bezel et al.
2021/0321508 A1 * 10/2021 Bezel ....................... H05H 1/46
2023/0053035 A1 2/2023 Bezel et al.
2024/0274430 A1 * 8/2024 Bezel ...................... H01J 61/40
2024/0276625 A1 * 8/2024 Bezel ...................... H01J 61/40
2024/0304435 A1 * 9/2024 Bezel ...................... H01J 61/12
2025/0106973 A1 * 3/2025 Gluchko ................. H01J 65/00

FOREIGN PATENT DOCUMENTS

WO WO-2004092693 A2 * 10/2004 ........... H05G 2/0094
WO 2007120521 A2 10/2007
WO WO-2011100322 A2 * 8/2011 ............ H01J 65/042

OTHER PUBLICATIONS

Korean Intellectual Property Office, International Search Report and Written Opinion received in International Application No. PCT/US2024/015661, Jun. 12, 2024, 8 pages.

* cited by examiner

200

100

HIGH-POWER COMPACT VUV LASER-SUSTAINED PLASMA LIGHT SOURCE

CROSS-REFERENCE TO RELATED APPLICATION

The present application claims priority to U.S. Provisional Application Ser. No. 63/445,307, filed Feb. 14, 2023, and U.S. Provisional Application Ser. No. 63/446,911, filed on Feb. 20, 2023, which are incorporated herein by reference in their entirety.

TECHNICAL FIELD

The present disclosure generally relates to plasma-based radiation sources, and, more particularly, to a high-power compact vacuum ultraviolet (VUV) laser-sustained plasma (LSP) light source.

BACKGROUND

Laser-sustained plasma (LSP) light sources are widely used in broadband inspection tools for use in semiconductor inspection and imaging. Generally, near-Infrared (NIR) Continuous Wave (CW) pump laser light is focused to a gas-containing vessel, where a plasma is ignited and sustained by absorption of the pump laser radiation. This vessel may be a lamp (e.g., glass bulb with or without electrodes used for plasma ignition), or a cell (e.g., optomechanical assembly with transparent walls to allow laser and plasma radiation in and out of the cell), or a chamber (e.g., metal vessel with transparent windows for laser light input and plasma light output), or similar assembly. The various plasma vessels have high internal pressure, which in operation reaches many tens or over a hundred of atmospheres. This high-pressure gas contained in the vessel is crucial for LSP operation. The plasma light is collected through transparent walls or windows of the vessel and is used as an illumination source for inspection tools.

There have been various versions of such sources developed. Most of these sources are designed to operate in the Visible (VIS) or Ultra-Violet (UV) spectral regions. When these sources are used to generate light in the vacuum ultraviolet (VUV) spectral region, and especially in the range of approximately 125-150 nm, the choice of practical constructions is relatively small, and it is limited to relatively low pump powers. A typical source for generating VUV light includes a metal chamber with multiple windows which couple the laser light in and out of the chamber. While different materials can be used for the laser windows, few choices exist for VUV generation. The most widely used in $MgF_2$, with the transmission cut-off wavelength of approximately 115 nm or $CaF_2$ with the transmission cut-off wavelength of approximately 125 nm.

There is a significant amount of short-wavelength radiation emitted from the LSP which has been shown to cause $MgF_2$ to degrade, especially if radiation less than 125 nm is present. The choice of efficient mirrors that can be used in VUV wavelength range is also limited (e.g., aluminum protected by $MgF_2$ coating), and they also were shown to damage rapidly by light less than 125 nm. Damage to optical components is greatly reduced if the irradiation wavelengths are longer than about 125 nm. High-pressure in the plasma chamber puts a practical limit to the size of the windows—if the window is close to the plasma, it damages rapidly by plasma radiation, if the window is far away from the plasma, it must be larger for the same collection NA. However, a larger window has to withstand the same pressure, and therefore it has to become thicker and bulkier, which is hard to achieve due to the poor strength of the optical materials available for VUV.

Therefore, it would be desirable to provide a VUV broadband light source that overcomes the limitations outlined above.

SUMMARY

A laser-sustained broadband light source is disclosed. In some aspects, the laser-sustained broadband light source includes: a gas containment structure containing a mixture of a first noble gas and a second noble gas; a filter tube positioned within the gas containment structure; an input optical window; a laser pump source configured to generate an optical pump, wherein the laser pump source is configured to direct the optical pump through the input optical window to sustain a plasma within the filter tube, wherein the plasma generates broadband light; wherein the first noble gas absorbs a portion of the broadband light within a first wavelength band and a second wavelength band; wherein the filter tube is configured to absorb a portion of the broadband light having a wavelength below a selected wavelength threshold, wherein absorption of broadband light by the first noble gas and the filter tube provide long-pass filtering of broadband light below the selected wavelength to protect one or more downstream optical elements from damage; an output optical window configured to transmit filtered broadband light out of the gas containment structure; a gas inlet; and a gas outlet, wherein the gas inlet and gas outlet are configured to generate a reverse vortex flow pattern within the filter tube.

A characterization system is disclosed. In some aspects, the characterization system includes a broadband light source including: a gas containment structure containing a mixture of a first noble gas and a second noble gas; a filter tube positioned within the gas containment structure; an input optical window; a laser pump source configured to generate an optical pump, wherein the laser pump source is configured to direct the optical pump through the input optical window to sustain a plasma within the filter tube, wherein the plasma generates broadband light; wherein the first noble gas absorbs a portion of the broadband light within a first wavelength band and a second wavelength band; wherein the filter tube is configured to absorb a portion of the broadband light having a wavelength below a selected wavelength threshold, wherein absorption of broadband light by the first noble gas and the filter tube provide long-pass filtering of broadband light below the selected wavelength to protect one or more downstream optical elements from damage; an output optical window configured to transmit filtered broadband light out of the gas containment structure; a gas inlet; and a gas outlet, wherein the gas inlet and gas outlet are configured to generate a reverse vortex flow pattern within the filter tube; a set of illumination optics configured to direct filtered broadband light from the broadband light source to one or more samples; a set of collection optics configured to collect light emanating from the one or more samples; and a detector assembly.

A method of generating VUV broadband light is disclosed. In some aspects, the method of generating VUV broadband light includes: containing a mixture of a first noble gas and a second noble gas within a gas containment structure; generating a reverse vortex flow pattern within a filter tube within the gas containment structure; generating an optical pump and directing the optical pump through an input optical window of the gas containment structure into the filter tube of the gas containment structure to sustain a plasma within the filter tube of the gas containment structure to generate broadband light; filtering the broadband light via the first noble gas and the filter tube to filter the broadband light having a wavelength below a selected wavelength threshold; and transmitting filtered broadband light out of the gas containment structure via an output optical window.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Referring generally to FIGS. 1-8, a compact laser-sustained plasma broadband light source including is described, in accordance with one or more embodiments of the present disclosure.

Figure 1:
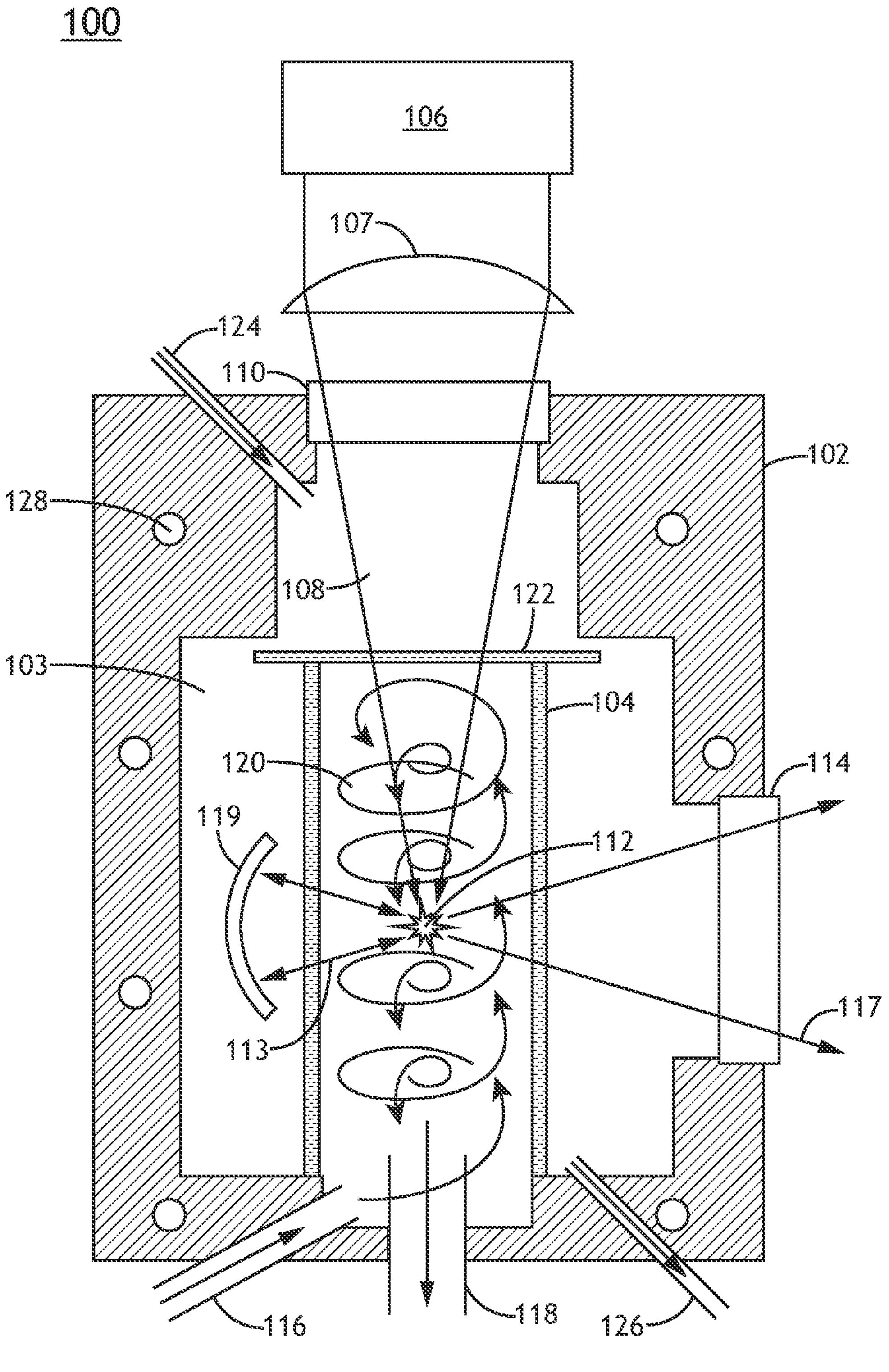
FIG. 1 illustrates a simplified schematic view of a compact laser-sustained plasma (LSP) broadband light source, in accordance with one or more embodiments of the present disclosure.

FIG. 1 illustrates a simplified schematic view of a compact LSP broadband light source 100, in accordance with one or more embodiments. In embodiments, the light source 100 includes a gas containment structure 102 containing a mixture of a first noble gas and a second noble gas. In embodiments, the light source 100 includes a filter tube 104 (e.g., $CaF_2$ filter tube) positioned within the gas containment structure 102. In embodiments, the light source 100 includes a gas inlet 116 and a gas outlet 118 configured to establish a reverse vortex flow pattern 120 within the filter tube 104. In embodiments, the light source 100 includes a laser pump source 106 configured to generate an optical pump 108. The laser pump source 106 and one or more focusing optics 107 may direct and focus the optical pump 108 through an input optical window 110 to sustain a plasma 112 within the filter tube 104 to generate broadband light 113. The laser pump source 106 may include any laser known in the art of plasma-based broadband light generation. In embodiments, the laser pump source 106 may include one or more continuous wave (CW) pump lasers and/or one or more pulsed lasers. For example, the laser pump source 106 may include, but is not limited to, a fiber laser, a thin-disk laser, a frequency-doubled laser, or a diode laser. The laser pump source 106 may be configured to emit light in the visible, IR (e.g., NIR), or ultraviolet regions.

In embodiments, the first noble gas absorbs a portion of the broadband light 113 within a first wavelength band and a second wavelength band. The filter tube 104 may absorb a portion of the broadband light 113 having a wavelength below a selected wavelength threshold. The absorption of broadband light by the first noble gas and the filter tube 104 provide long-pass filtering of broadband light below the selected wavelength to protect one or more downstream optical elements (e.g., lenses, mirrors, windows) from degradation. In embodiments, the filtered broadband light 117 is transmitted out of the gas containment structure 102 through an output optical window 114 (e.g., $MgF_2$ window). In embodiments, the light source 100 includes one or more collection optical elements for collecting the filtered broadband light 117 and transmitting the filtered broadband light 117 through an output optical window (e.g., $MgF_2$ window) to one or more downstream optical elements outside of the gas containment structure 102. For example, as shown in FIG. 1, the light source 100 may include a collection mirror such as, but not limited to, a retroreflector 119. By way of another example, the light source 100 may include a collection lens (e.g., shown in FIG. 2).

The reverse vortex pattern 120 of the gas flow inside the filter tube 104 allows for the optical pump 108 to avoid propagation through the plasma plume and other regions of gas with high temperature gradients. Rather, the optical pump 108 propagates through the cold region of gas with low gradients of refraction. This arrangement results in low noise as well. In embodiments, unlike in former reverse vortex designs where a high-NA laser pump was used to pump the plasma, the optical pump of the present disclosure may be focused with a relatively small NA, freeing available solid angle for plasma light collection. Plasma growth in the direction of laser propagation is mitigated by the axial velocity of reverse vortex gas flow. LSP sources implementing reverse vortex gas flow configurations are described in U.S. Pat. No. 11,690,162B2, issued on Jun. 27, 2023; U.S. Pat. No. 11,776,804B2, issued on Oct. 3, 2023; and U.S. Patent Publication No. 2023/0053035A1, which are each incorporated by reference in their entirety.

Figure 2:
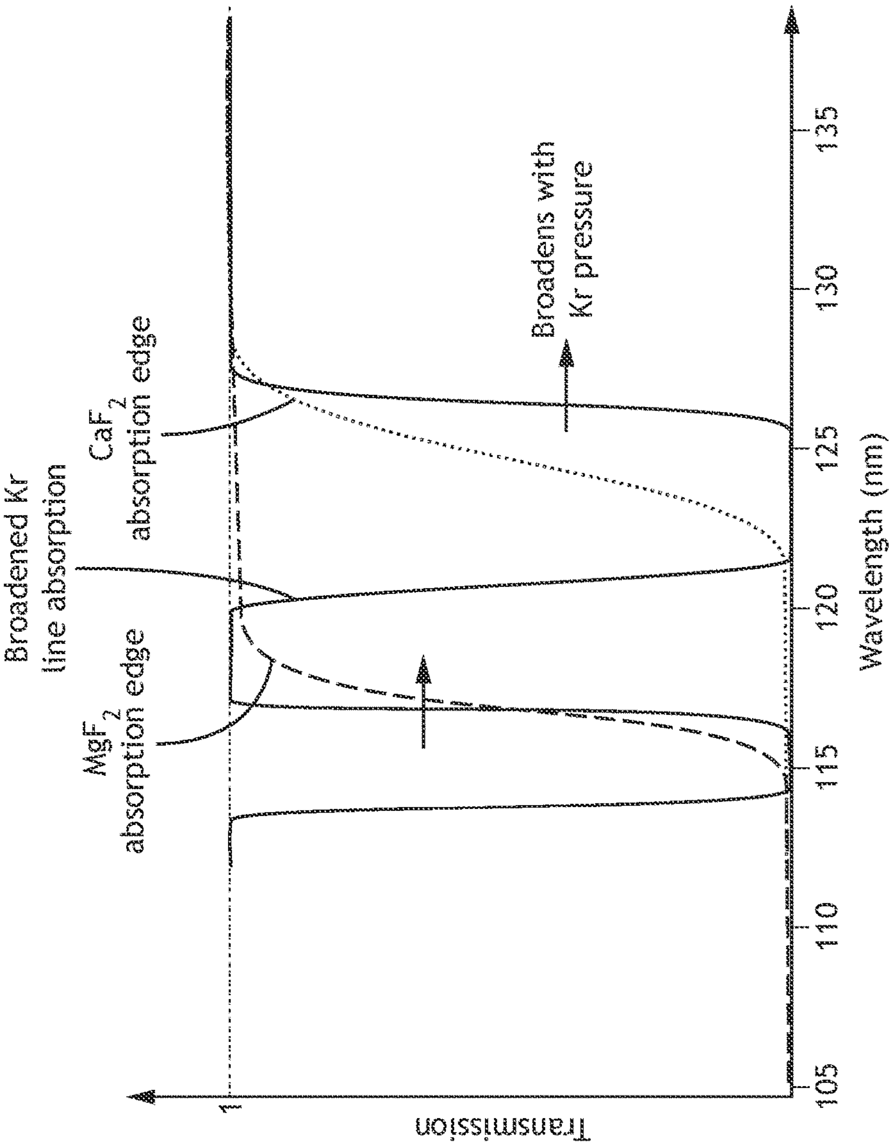
FIG. 2 illustrates a data graph depicting the transmission characteristics of the materials of the LSP broadband light source in the case of a $CaF_2$ filter tube and a gas mixture of Ar/Kr, in accordance with one or more embodiments of the present disclosure.

It is noted that the first noble gas and the material of the filter tube may be selected to achieve the desired long-pass filtering characteristics and may include a variety of first noble gas and filter tube material combinations. It is noted that the scope of the present disclosure should not be interpreted to be limited to any a particular noble gas or filter tube material. By way of example, in a first combination, the first noble gas may include krypton, the second noble gas may include argon, and the material of the filter tube may include $CaF_2$. Such a combination is particularly useful for protecting $MgF_2$-based optical elements (e.g., output windows, collection lenses, etc.) from the broadband output. FIG. 2 illustrates a data graph depicting the transmission characteristics of the materials of the light source 100 in the case of a $CaF_2$ filter tube and a gas mixture of Ar/Kr. Krypton has an absorption line centered at approximately 123.58 nm and thus blocks radiation at $CaF_2$ 123 nm absorption edge, thereby protecting the $CaF_2$ filter tube from degradation. The spectrum of the light transmitted through the Ar/Kr gas mixture and the $CaF_2$ filter tube has a sharp cutoff at about 125 nm. This cutoff is tunable by a few nm by changing the partial pressure of Kr within the gas containment structure 102. The filtered broadband light 117 emitted from the light source 100 is not as damaging to $MgF_2$, nor is it absorbed by $MgF_2$ windows or other optics given the $MgF_2$ absorption edge is at approximately 116 nm which is below the 125 nm cutoff of the filtered broadband light 117. As a result, the radiative heat load on the $MgF_2$ windows is greatly reduced, and they can be made smaller and thinner, and they can be placed much closer to the plasma 112 reducing the force from pressure they have to hold. Similarly, the laser window and any other optics may be placed closer to the plasma and reduced in size as discussed further herein. In addition, structural components of the gas containment structure 102 may be placed at relatively large distances from the plasma 112, thereby reducing the radiative heat load and making their cooling easier and their operating temperature lower. Low temperatures of the windows and chamber walls reduce the noise from refraction.

By way of another example, in a second combination, the first noble gas may include xenon (e.g., xenon mixed with argon) and the filter tube 104 may include sapphire. In this case, sapphire bulk damage is reduced by the Xe 146.96 nm absorption line which coincides with sapphire absorption edge, thereby protecting the sapphire filter tube from damage. It is noted that the gas mixture within the gas containment structure is not limited to Kr/Ar or Xe/Ar. For example, the gas may include a few percent of Kr in Ar, pure Kr, a Ar/Kr/Xe mixture, pure Xe, and so on. The addition of Xe blocks emission below about 132-136 nm and in the 144 to about 150-160 nm band depending on Xe partial pressure. Utilizing different mixture gases and gas combinations allows for the protection of different filter tube and output window materials. For example, Ar mixed with a few percent of Kr and Xe gas may be used in combination with a crystal quartz, fused silica, $CaF_2$ or sapphire filter tube and the output and laser windows may be made of fused silica, sapphire, $MgF_2$, or $CaF_2$.

In embodiments, the gas containment structure 102 includes a tube cover 122 positioned above the filter tube 104. The tube cover 122 may separate the volume of gas within the filter tube 104 from the rest of the gas containment structure 102. In embodiments, the seal between the volume inside the filter tube 104 and the rest of the gas containment structure 102 is not hermetic. In contrast to other reverse vortex flow light sources where a tube is used to contain high pressure, neither the tube nor the cover of embodiments of the present disclosure bear a structural load and may be relatively thin. The filter tube 104 and the tube cover are used to separate the volume of gas inside the filter tube, where fast reverse vortex gas flow 120 is formed and the rest of the gas containment structure 102. The filter tube 104 and the tube cover 122 are configured to i) form a small cylindrical volume of gas for the reverse vortex flow to operate properly; filter out light with the wavelengths shorter than a selected wavelength (e.g., about 125 nm); and transmit light with wavelengths longer than a selected wavelength (e.g., about 125 nm).

Being in close proximity to the plasma 112, a $CaF_2$ tube absorbs wavelengths shorter than about 123 nm. Following the example above, the thermal load for a 2 cm tube is on the order of 10 $W/cm^2$. The tube temperature is not expected to rise significantly because the inner surface of the tube is very efficiently cooled by fast high-pressure tangential gas flow of the reverse vortex flow 120. Typical heat transfer coefficients in 100 atm Ar with the velocities of 100 m/s is many thousands $W/m^2/K$, so the temperature rise of the filter tube 104 is not expected to exceed a few tens degrees Celsius.

In embodiments, the gas containment structure 102 includes one more water-cooling channels 128. The water cooling channels 128 may serve to remove heat from the main construction elements of the gas containment structure 102 exposed to laser radiation from the pump source 106 and broadband light from the plasma 112.

In embodiments, the gas containment structure 102 includes a gas purge inlet 124 and gas purge outlet 126. The gas purge inlet 124 and gas purge outlet 126 may provide low-flow purging of the high-pressure gas within the gas containment structure 102 which may organize the gas flow inside the gas containment structure 102.

Figure 3A:
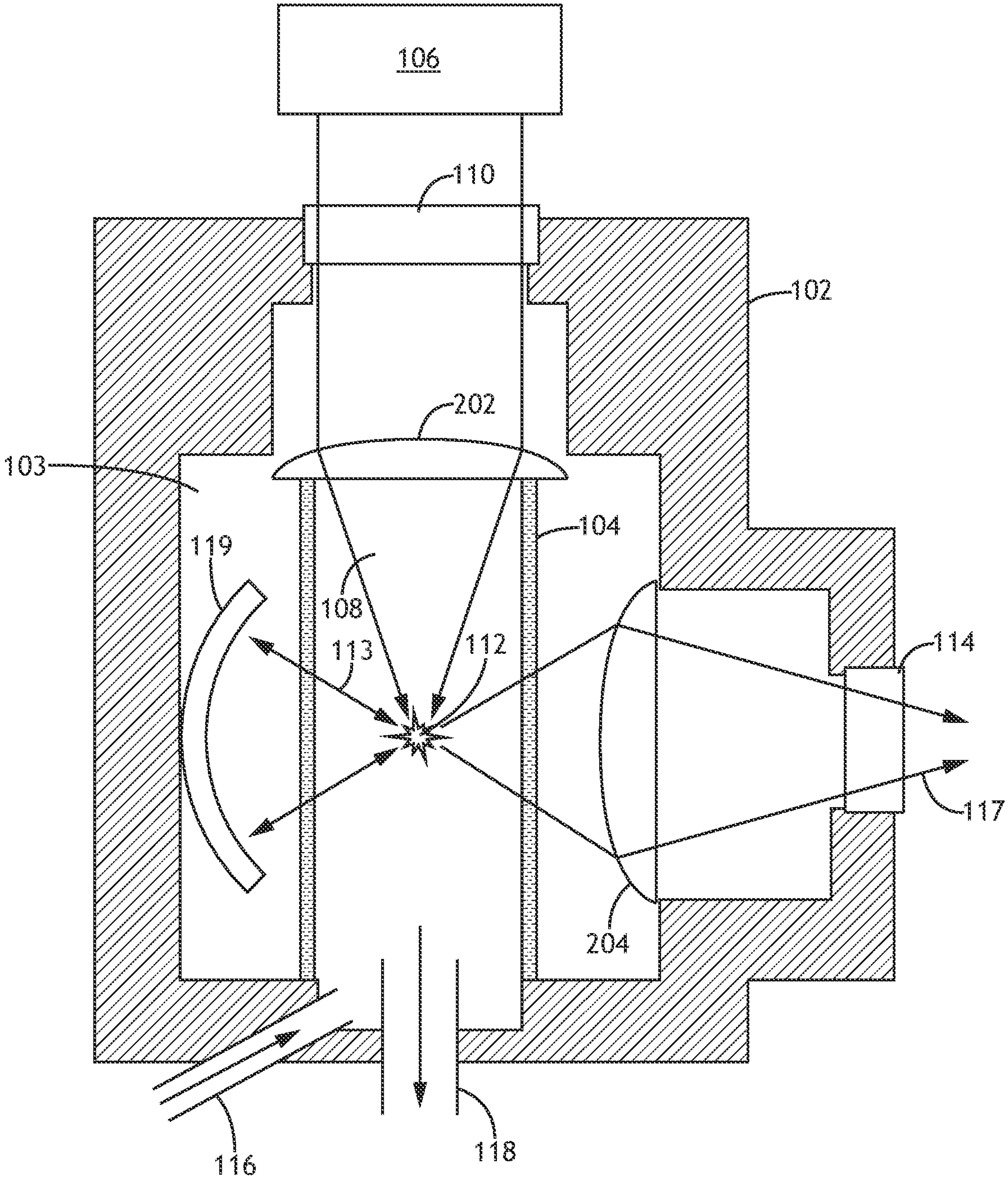
FIG. 3A illustrates a simplified schematic view of compact LSP broadband light source, in accordance with one or more alternative and/or additional embodiments of the present disclosure.

FIG. 3A illustrates a simplified schematic view of compact LSP broadband light source 100, in accordance with one or more alternative and/or additional embodiments. In embodiments, one or more optical elements may be positioned within the gas containment structure 102. For example, the laser focusing lens 202 may be integrated with the cover of the filter tube 104. By way of another example, the collection lens 204 may be positioned within the gas containment structure 102.

Since embodiments of the present disclosure serve to reduce damage and radiative heat load on the optical elements of the light source 100, the optical elements of the light source 100 may be made smaller and placed in closer proximity to the plasma 112 than is typically suitable. In the case of $MgF_2$ optical elements, low damage rates of $MgF_2$ optical elements irradiated by light filtered by the filter tube (e.g., $CaF_2$ filter tube) and the first noble gas (e.g., Kr)

extend lifetime of the optical elements and allow for longer service/replacement intervals, thereby reducing the frequency with which the gas containment structure 102 requires being opened. For example, the laser focusing lens 202 may be integrated with the tube cover positioned on top of the filter tube 104. By way of another example, the laser focusing lens 202 may be integrated with the laser high-pressure window. In embodiments, the collection lens 204 may be placed inside the pressurized volume of the gas containment structure 102. The collection lens 204 may be used to focus the filtered plasma light 117 through a smaller sized high-pressure output window 114. In embodiments, a retroreflector 119 may be positioned within the pressurized volume of the gas containment structure 102.

Figure 3B:
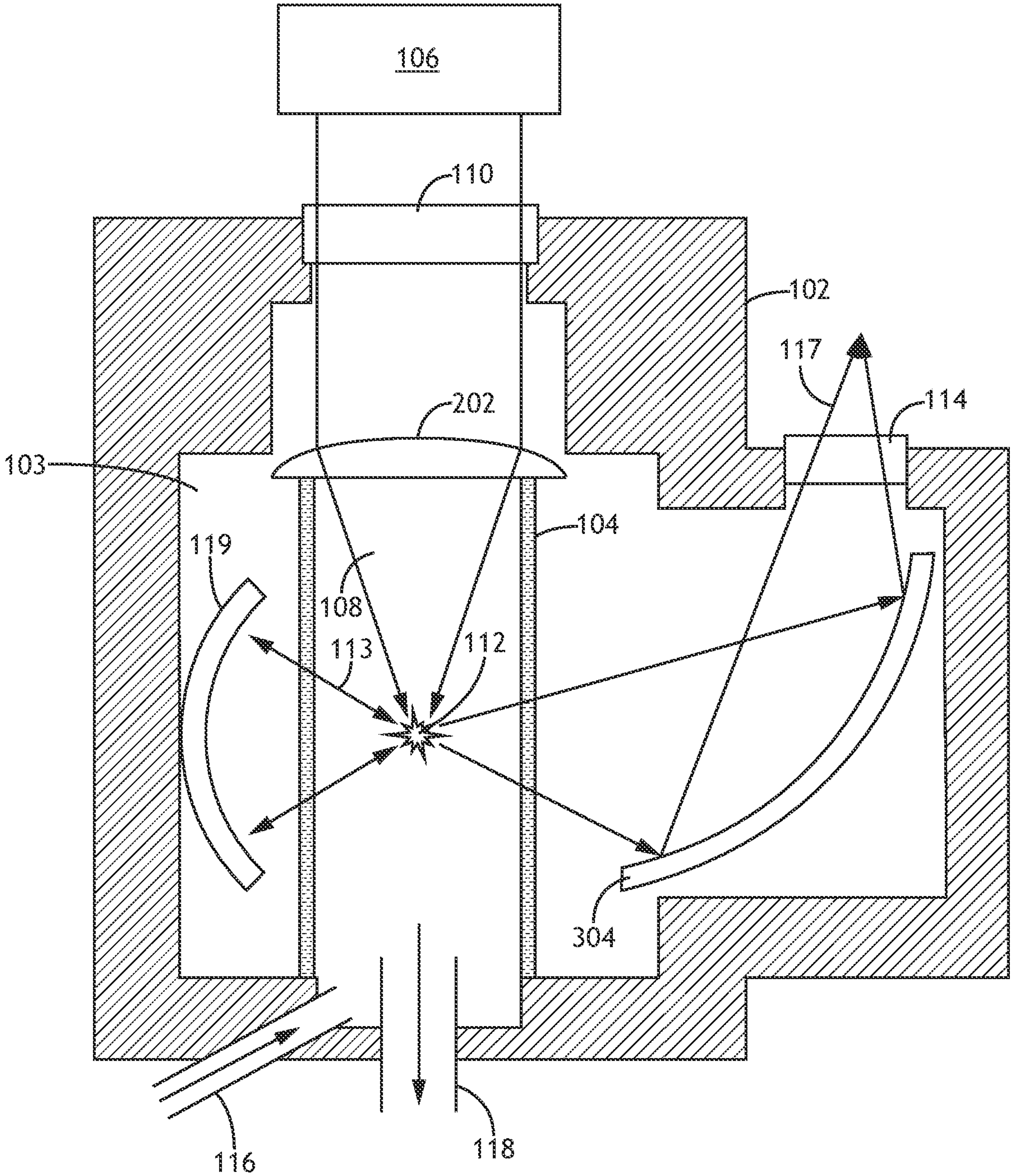
FIG. 3B illustrates a simplified schematic view of compact LSP broadband light source, in accordance with one or more alternative and/or additional embodiments of the present disclosure.

FIG. 3B illustrates a simplified schematic view of compact LSP broadband light source 100, in accordance with one or more alternative and/or additional embodiments. It is noted that the various implementations and components of FIGS. 1-3A should be interpreted to extend to FIG. 3B unless otherwise noted. In this embodiment, the light source 100 implements a collection mirror 304. In embodiments, the collection mirror 304 may be placed inside the pressurized volume of the gas containment structure 102. The collection mirror 304 may be used to focus the filtered plasma light 117 through a smaller sized high-pressure output window 114.

Figure 4:
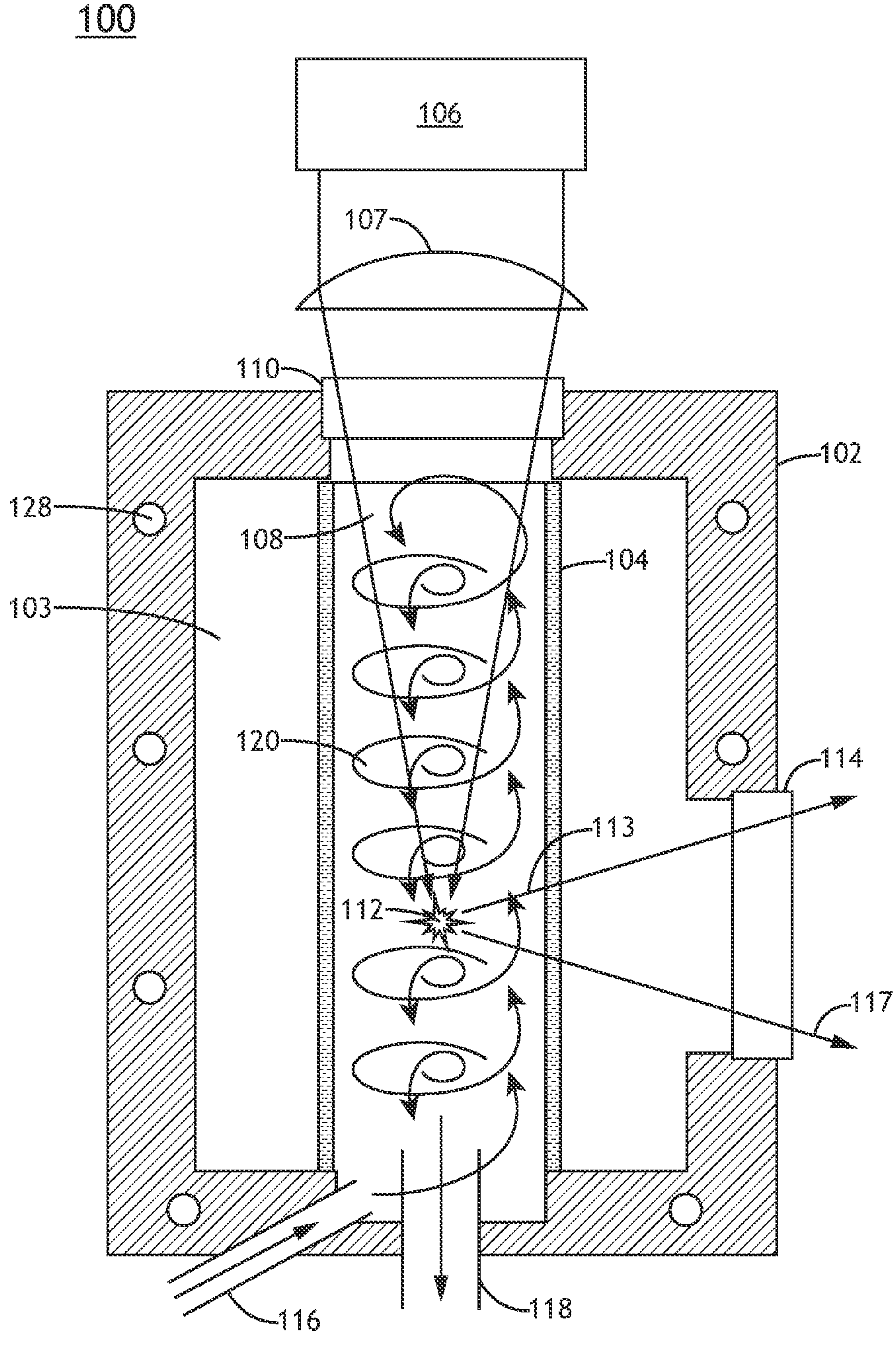
FIG. 4 illustrates a simplified schematic view of compact LSP broadband light source, in accordance with one or more alternative and/or additional embodiments of the present disclosure.

FIG. 4 illustrates a simplified schematic view of compact LSP broadband light source 100, in accordance with one or more alternative and/or additional embodiments. It is noted that the various implementations and components of FIGS. 1-3B should be interpreted to apply to FIG. 4 unless otherwise noted. In embodiments, the light source 100 may operate without the tube cover described previously herein. In this embodiment, the filter tube 104 is extended upward to the laser input window 110 to form a restricted flow space where the gas flow can change axial direction. Removal of the tube cover may reduce protection of the laser window 110, a coverless light source 100 is an option in settings where damage to the laser window 110 is of little concern. For example, a coverless light source 100 may be an option in settings where the laser window 110 is formed from sapphire as damage to sapphire does not interfere significantly with laser transmission.

Figure 5A:
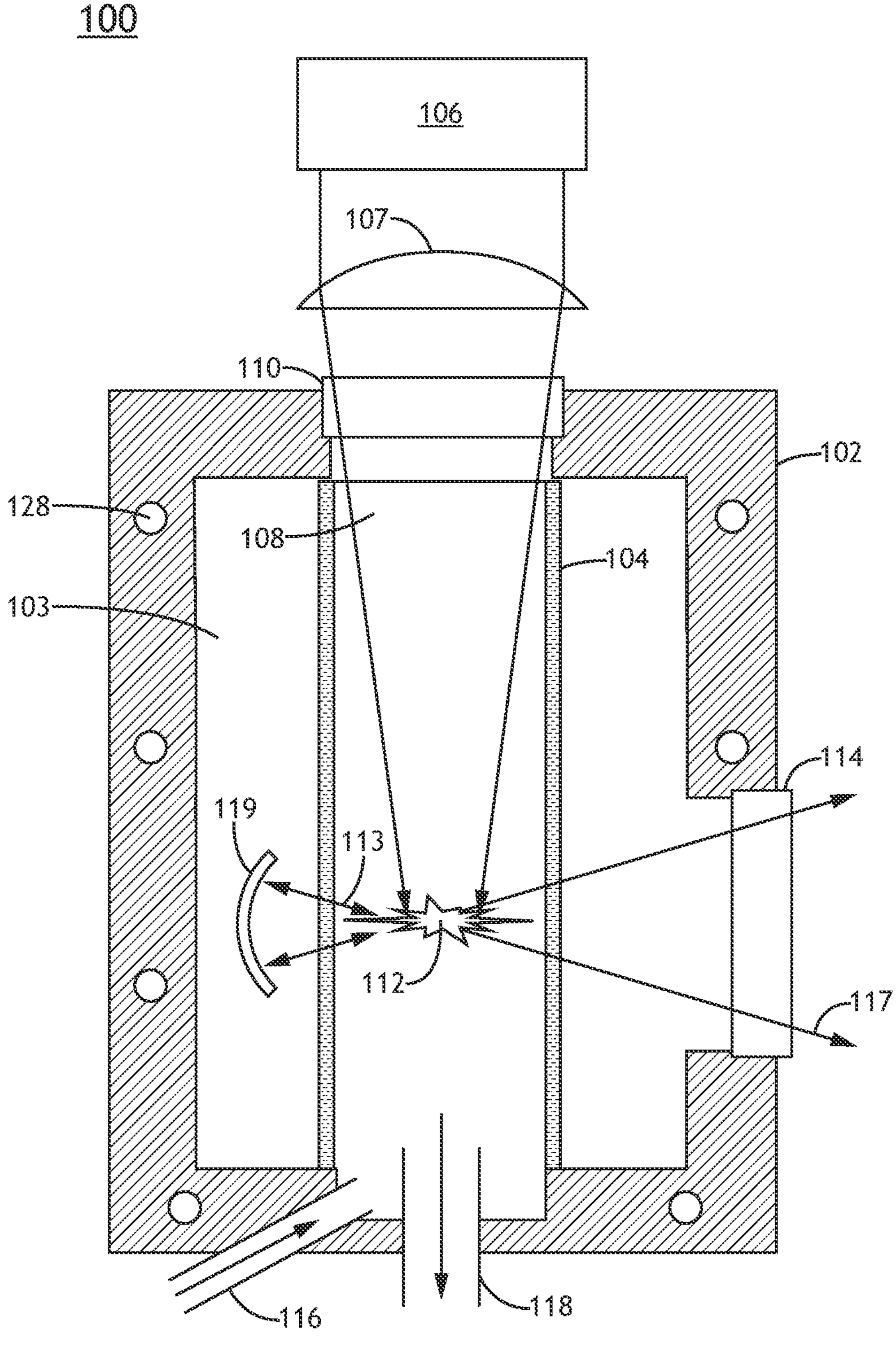
FIG. 5A illustrates a simplified schematic view of compact LSP broadband light source, in accordance with one or more alternative and/or additional embodiments.
Figure 5B:
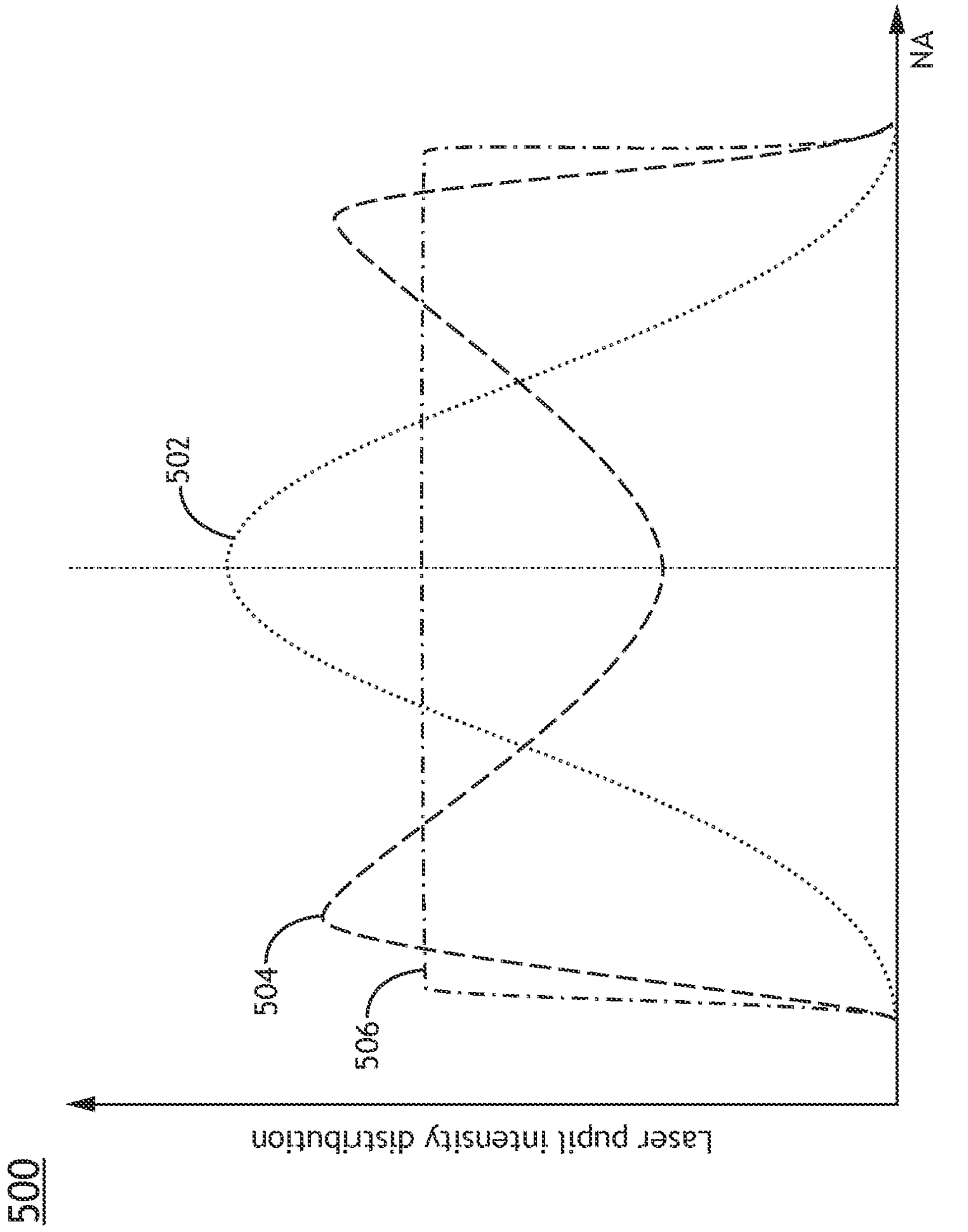
FIG. 5B illustrates possible pupil intensity distributions for shaping the plasma of the LSP broadband light source, in accordance with one or more alternative and/or additional embodiments.

FIG. 5A illustrates a simplified schematic view of compact LSP broadband light source 100, in accordance with one or more alternative and/or additional embodiments. It is noted that the various implementations and components of FIGS. 1-4 should be interpreted to apply to FIG. 5A unless otherwise noted. It is noted that various shapes of pump beams may be implemented. As shown in FIG. 5A, the optical pump 108 may be focused on the plane of the figure and may stay extended in the direction of collection. In this sense, an elongated LSP may be formed by an optical pump 108 focused to a line in the collection direction (e.g., tight focus in the direction normal to the plane of FIG. 5A). FIG. 5B illustrates possible pupil intensity distributions 502, 504, 506 for shaping the plasma 112. The laser pupil distribution may be bell-shaped 502, inverted doughnut-like bell-shape 504, or flat top shape 506.

Figure 6:
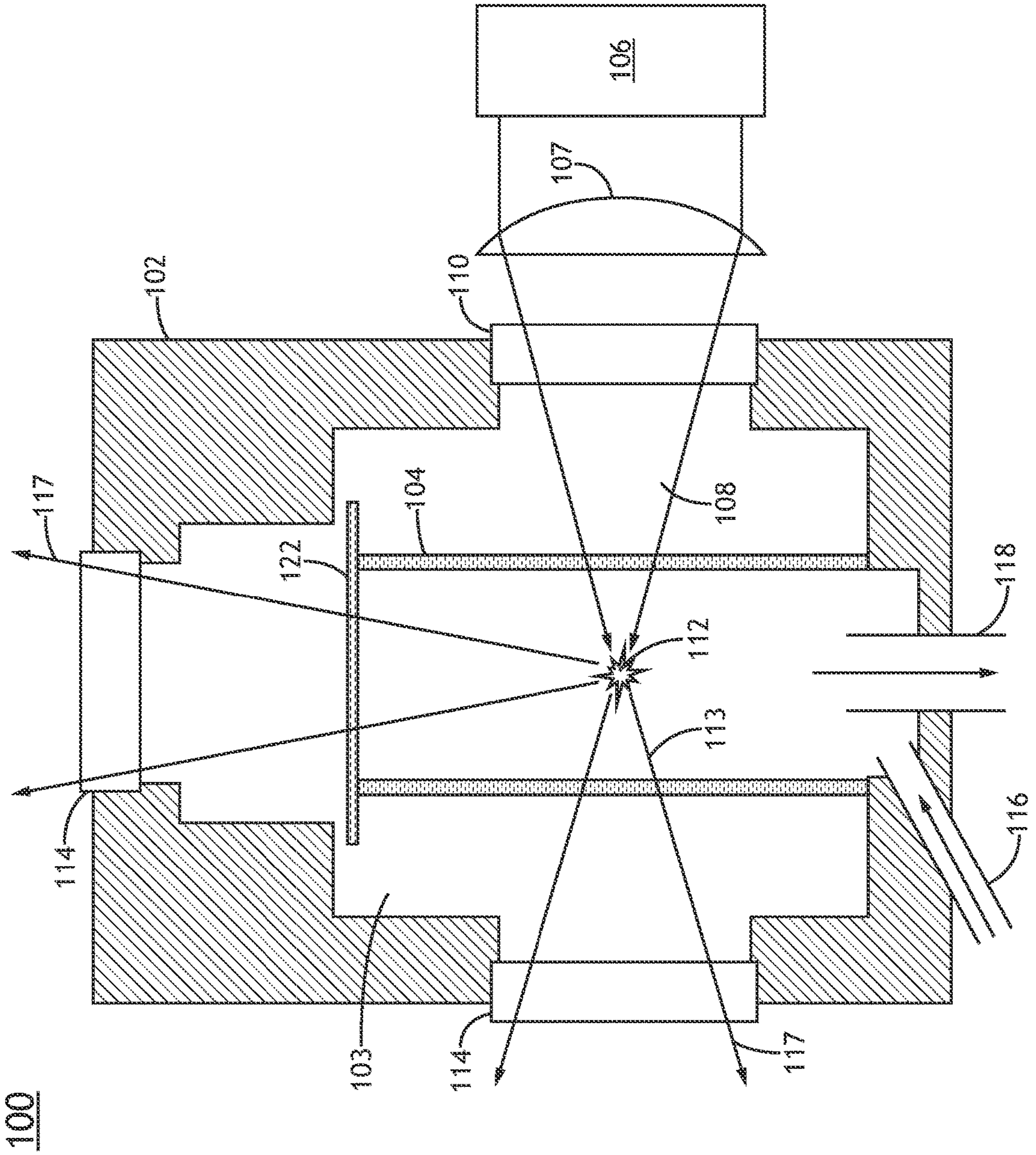
FIG. 6 illustrates a simplified schematic view of compact LSP broadband light source, in accordance with one or more alternative and/or additional embodiments of the present disclosure.

FIG. 6 illustrates a simplified schematic view of compact LSP broadband light source 100, in accordance with one or more alternative and/or additional embodiments. It is noted that the various implementations and components of FIGS. 1-5B should be interpreted to apply to FIG. 6 unless otherwise noted. In embodiments, the optical pump 108 laser enters the gas containment structure 102 through a side-located input optical window 110 and enters the filter tube 104 through a side portion of the filter tube 104. In this embodiment, the filtered broadband light 117 may be collected through a side-located output window 114 and/or through the tube cover 122.

Figure 7:
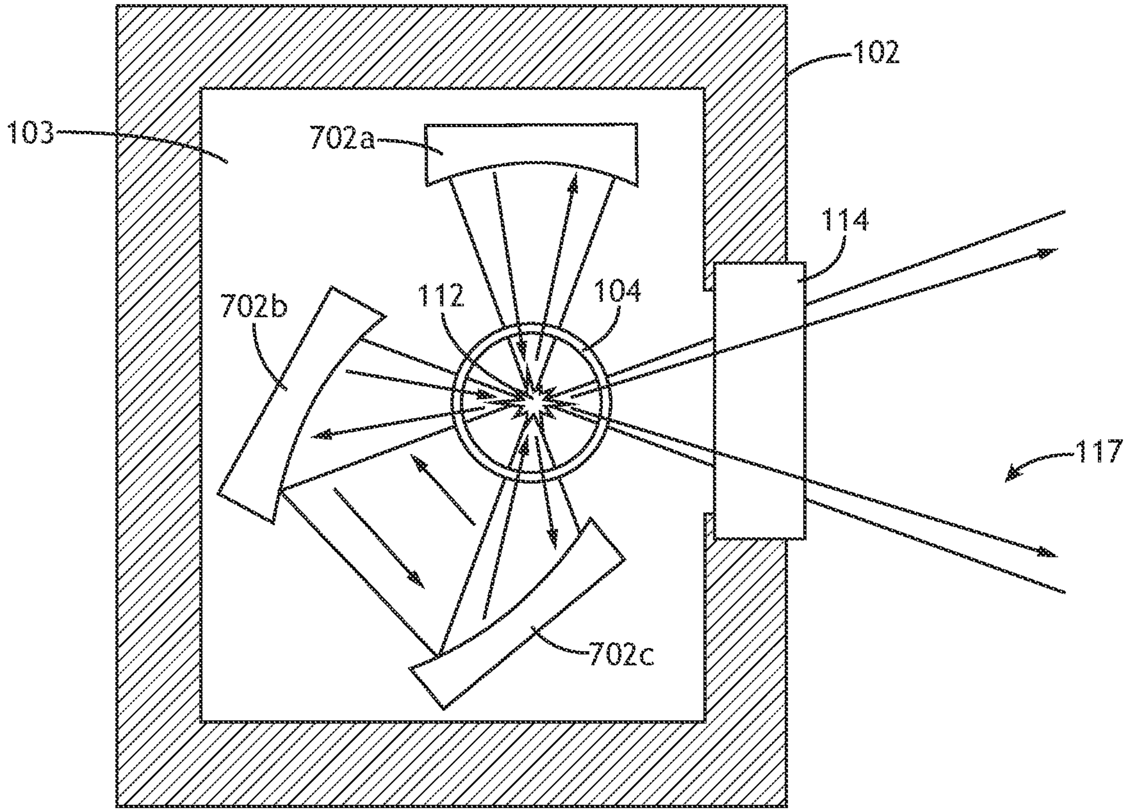
FIG. 7 illustrates a simplified schematic view of compact LSP broadband light source, in accordance with one or more alternative and/or additional embodiments of the present disclosure.

FIG. 7 illustrates a simplified schematic axial view of a multi-pass compact LSP broadband light source 100, in accordance with one or more alternative and/or additional embodiments. It is noted that the various implementations and components of FIGS. 1-6 should be interpreted to apply to FIG. 7 unless otherwise noted. In embodiments, a multi-pass collection arrangement may be implemented with the optics 702*a*, 702*b*, 702*c* needed for collection placed inside the gas containment structure 102 or outside of the gas containment structure 102. Multi-pass collection increases collected radiance. An example of four-pass collection is presented in FIG. 7. Large solid angle available for plasma light collection allows for various mirror arrangements, and lower damage to optical components allows placing the mirrors relatively close to the plasma 112 reducing the overall size of the light source 100.

Figure 8:
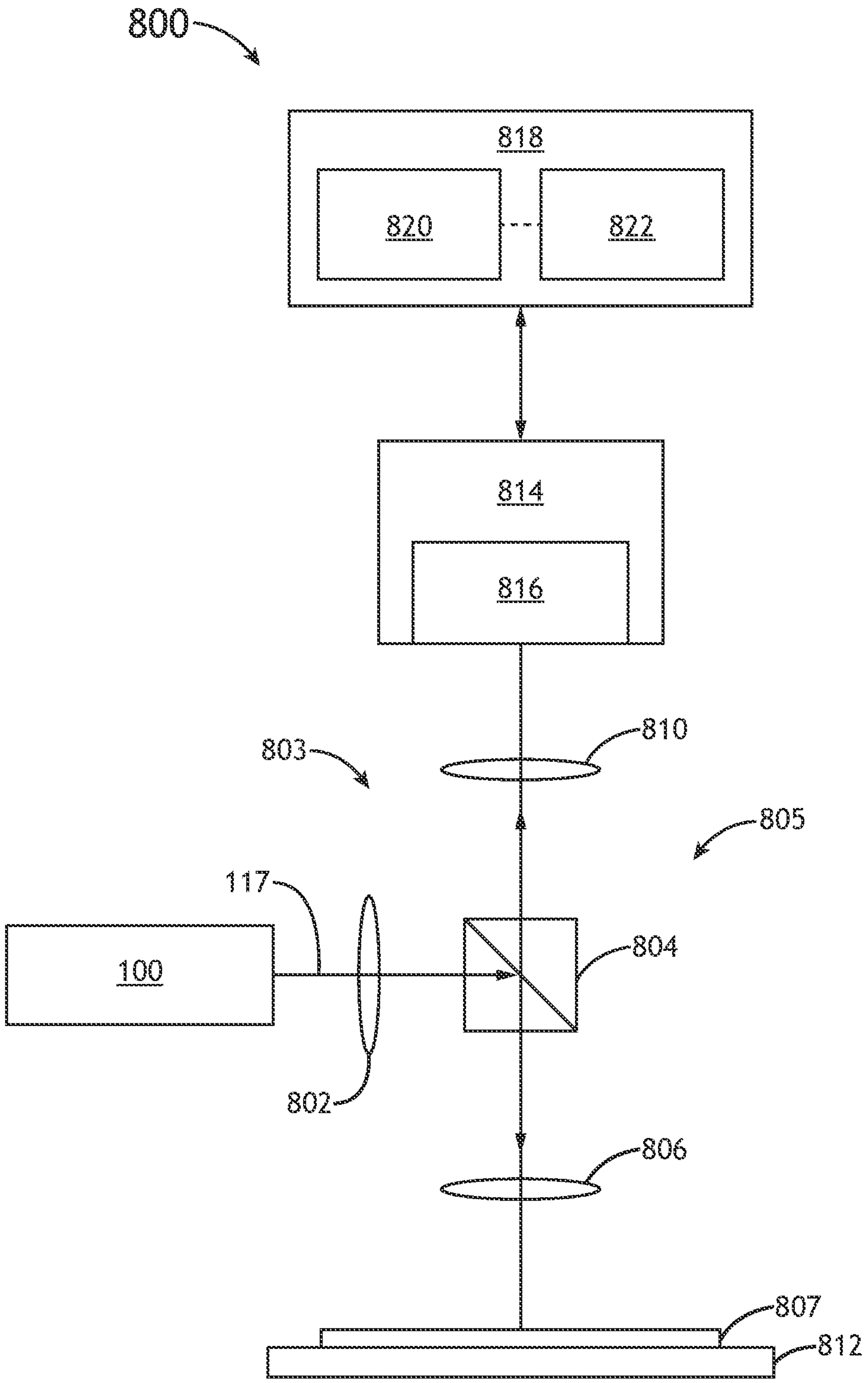
FIG. 8 illustrates a simplified schematic view of a characterization system incorporating the compact LSP broadband light source, in accordance with one or more alternative and/or additional embodiments of the present disclosure.

FIG. 8 illustrates a simplified schematic view of an optical characterization system 800 incorporating the compact LSP broadband light source, in accordance with one or more alternative and/or additional embodiments. In embodiments, system 800 includes the LSP light source 100, an illumination arm 803, a collection arm 805, a detector assembly 814, and a controller 818 including one or more processors 820 and memory 822.

It is noted herein that system 800 may comprise any imaging, inspection, metrology, lithography, or other characterization system known in the art. In this regard, system 800 may be configured to perform inspection, optical metrology, lithography, and/or any form of imaging on a sample 807. Sample 807 may include any sample known in the art including, but not limited to, a wafer, a reticle, a photomask, and the like. It is noted that system 800 may incorporate one or more of the various embodiments of the LSP light source 100 described throughout the present disclosure.

In one embodiment, sample 807 is disposed on a stage assembly 812 to facilitate movement of sample 807. Stage assembly 812 may include any stage assembly 812 known in the art including, but not limited to, an X-Y stage, an R-θ stage, and the like. In another embodiment, stage assembly 812 is capable of adjusting the height of sample 807 during inspection or imaging to maintain focus on sample 807.

In one embodiment, the illumination arm 803 is configured to direct broadband light 117 from the broadband LSP light source 100 to the sample 807. The illumination arm 803 may include any number and type of optical components known in the art. In one embodiment, the illumination arm 803 includes one or more optical elements 802, a beam splitter 804, and an objective lens 806. In this regard, illumination arm 803 may be configured to focus broadband light 117 from the broadband LSP light source 100 onto the surface of the sample 807. The one or more optical elements 802 may include any optical element or combination of optical elements known in the art including, but not limited to, one or more mirrors, one or more lenses, one or more polarizers, one or more gratings, one or more filters, one or more beam splitters, and the like. It is noted herein that the collection location may include, but is not limited to, one or more of the optical elements 802, a beam splitter 804, or an objective lens 806.

In one embodiment, system 800 includes a collection arm 805 configured to collect light reflected, scattered, diffracted, and/or emitted from sample 807. In another embodiment, collection arm 805 may direct and/or focus the light from the sample 807 to a sensor 816 of a detector assembly 814. It is noted that sensor 816 and detector assembly 814 may include any sensor and detector assembly known in the art. The sensor 816 may include, but is not limited to, a CCD sensor or a CCD-TDI sensor. Further, sensor 816 may include, but is not limited to, a line sensor or an electron-bombardment line sensor.

In one embodiment, detector assembly 814 is communicatively coupled to a controller 818 including one or more processors 820 and memory 822. For example, the one or more processors 820 may be communicatively coupled to memory 822, wherein the one or more processors 820 are configured to execute a set of program instructions stored on memory 822. In one embodiment, the one or more processors 820 are configured to analyze the output of detector assembly 814. In one embodiment, the set of program instructions are configured to cause the one or more processors 820 to analyze one or more characteristics of sample 807. In another embodiment, the set of program instructions are configured to cause the one or more processors 820 to modify one or more characteristics of system 800 in order to maintain focus on the sample 807 and/or the sensor 816. For example, the one or more processors 820 may be configured to adjust the objective lens 806 or one or more optical elements 802 in order to focus broadband light 117 from broadband LSP light source 100 onto the surface of the sample 807. By way of another example, the one or more processors 820 may be configured to adjust the objective lens 806 and/or one or more optical elements 810 in order to collect illumination from the surface of the sample 807 and focus the collected illumination on the sensor 816.

It is noted that the system 800 may be configured in any optical configuration known in the art including, but not limited to, a dark-field configuration, a bright-field orientation, and the like. The system 800 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

Additional details of various embodiments of optical characterization system 800 are described in U.S. Pat. No. 7,957,066B2, entitled "Split Field Inspection System Using Small Catadioptric Objectives," issued on Jun. 7, 2011; U.S. Published Patent Application 2007/0002465, entitled "Beam Delivery System for Laser Dark-Field Illumination in a Catadioptric Optical System," published on Jan. 4, 2007; U.S. Pat. No. 5,999,310, entitled "Ultra-broadband UV Microscope Imaging System with Wide Range Zoom Capability," issued on Dec. 7, 1999; U.S. Pat. No. 7,525,649 entitled "Surface Inspection System Using Laser Line Illumination with Two Dimensional Imaging," issued on Apr. 28, 2009; U.S. Published Patent Application 2013/0114085, entitled "Dynamically Adjustable Semiconductor Metrology System," by Wang et al. and published on May 9, 2013; U.S. Pat. No. 5,608,526, entitled "Focused Beam Spectroscopic Ellipsometry Method and System, by Piwonka-Corle et al., issued on Mar. 4, 1997; and U.S. Pat. No. 6,297,880, entitled "Apparatus for Analyzing Multi-Layer Thin Film Stacks on Semiconductors," by Rosencwaig et al., issued on Oct. 2, 2001, which are each incorporated herein by reference in their entirety.

The one or more processors 820 of the present disclosure may include any one or more processing elements known in the art. In this sense, the one or more processors 820 may include any microprocessor-type device configured to execute software algorithms and/or instructions. In one embodiment, the one or more processors 820 may consist of a desktop computer, mainframe computer system, workstation, image computer, parallel processor, or other computer system (e.g., networked computer) configured to execute a program configured to operate the system 800 and/or Broadband LSP light source 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non transitory memory medium 822. Moreover, different subsystems of the various systems disclosed may include processor or logic elements suitable for carrying out at least a portion of the steps described throughout the present disclosure. Therefore, the above description should not be interpreted as a limitation on the present disclosure but merely an illustration.

The memory medium 822 may include any storage medium known in the art suitable for storing program instructions executable by the associated one or more processors 820. For example, the memory medium 822 may include a non-transitory memory medium. For instance, the memory medium 822 may include, but is not limited to, a read-only memory, a random access memory, a magnetic or optical memory device (e.g., disk), a magnetic tape, a solid state drive, and the like. In another embodiment, the memory 822 is configured to store one or more results and/or outputs of the various steps described herein. It is further noted that memory 822 may be housed in a common controller housing with the one or more processors 820. In an alternative embodiment, the memory 822 may be located remotely with respect to the physical location of the processors 820. For instance, the one or more processors 820 may access a remote memory (e.g., server), accessible through a network (e.g., internet, intranet, and the like). In another embodiment, memory medium 822 maintains program instructions for causing the one or more processors 820 to carry out the various steps described through the present disclosure.

Figure 9:
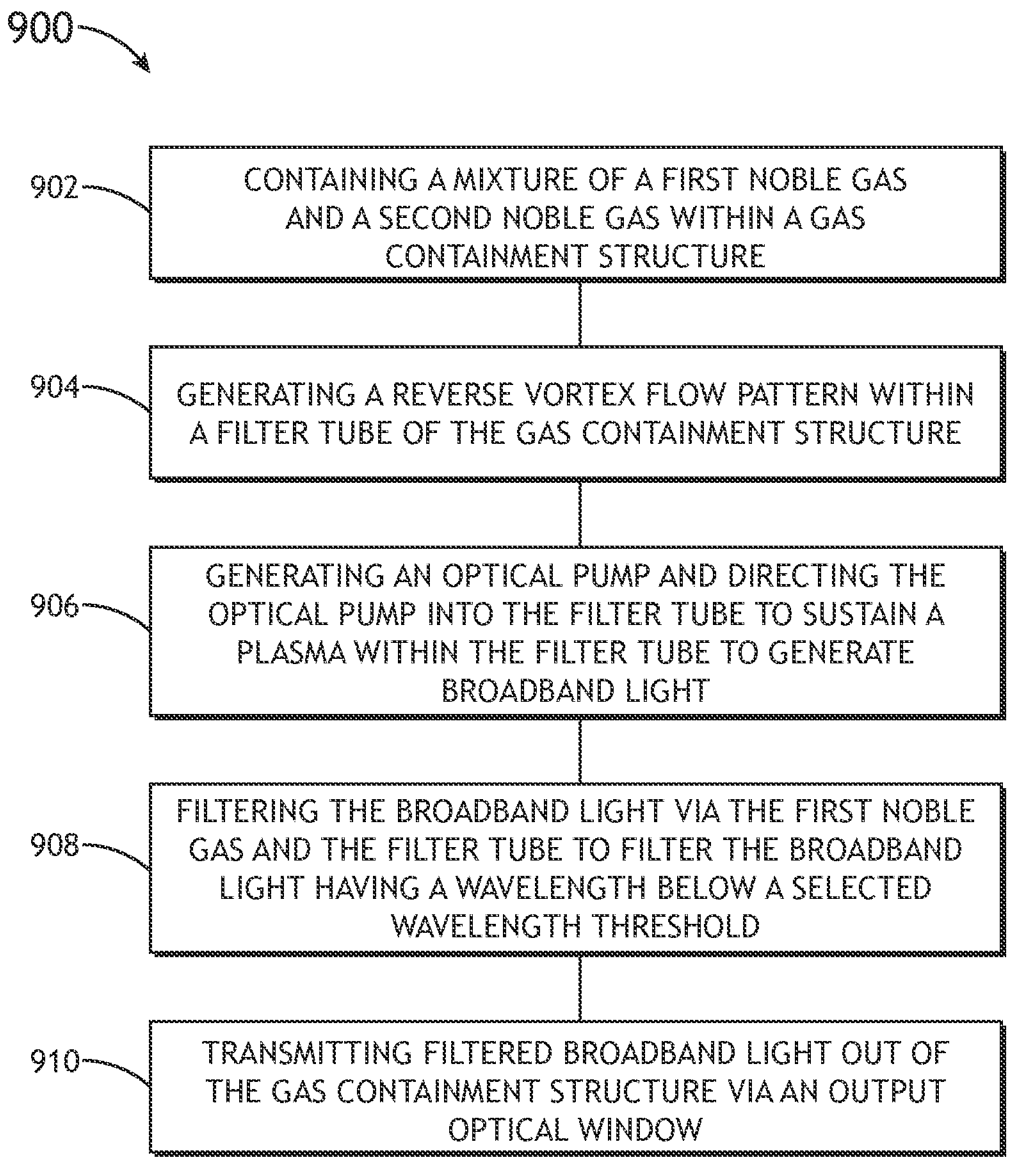
FIG. 9 illustrates a process flow diagram depicting a method of generating VUV light with a compact LSP broadband light source, in accordance with one or more embodiments of the present disclosure.

FIG. 9 illustrates a process flow diagram depicting a method 900 generating VUV light with a compact LSP broadband light source, in accordance with one or more alternative and/or additional embodiments. It is noted herein that the steps of method 900 may be implemented all or in part by broadband LSP light source 100. It is further recognized, however, that the method 900 is not limited to the broadband LSP light source 100 in that additional or alternative system-level embodiments may carry out all or part of the steps of method 900.

In step 902, method 900 includes containing a mixture of a first noble gas and a second noble gas within a gas containment structure. In step 904, method 900 includes generating a reverse vortex flow pattern within a filter tube within the gas containment structure. In step 906, method 900 includes generating an optical pump and directing the optical pump through an input optical window of the gas containment structure into the filter tube of the gas containment structure to sustain a plasma within the filter tube of the gas containment structure to generate broadband light. In step 908, method 900 includes filtering the broadband light via the first noble gas and the filter tube to filter the broadband light having a wavelength below a selected wavelength threshold. In step 910, method 900 includes transmitting filtered broadband light out of the gas containment structure via an output optical window.

One skilled in the art will recognize that the herein described components, operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

The invention claimed is:

1. A laser-sustained plasma broadband light source comprising:

a gas containment structure containing a mixture of a first noble gas and a second noble gas;

a filter tube positioned within the gas containment structure;

an input optical window;

a laser pump source configured to generate an optical pump, wherein the laser pump source is configured to direct the optical pump through the input optical window to sustain a plasma within the filter tube, wherein the plasma generates broadband light;

wherein the first noble gas absorbs a portion of the broadband light within a first wavelength band and a second wavelength band;

wherein the filter tube is configured to absorb a portion of the broadband light having a wavelength below a selected wavelength threshold, wherein absorption of broadband light by the first noble gas and the filter tube provide long-pass filtering of broadband light below the selected wavelength threshold to protect one or more downstream optical elements from damage;

an output optical window configured to transmit filtered broadband light out of the gas containment structure;

a gas inlet; and a gas outlet, wherein the gas inlet and gas outlet are configured to generate a reverse vortex flow pattern within the filter tube.

2. The broadband light source of claim 1, wherein the absorption of broadband light at the first wavelength by the first noble gas protects the filter tube from degradation.

3. The broadband light source of claim 1, wherein a transmission edge of the long-pass filtering is tunable via adjustment of a partial pressure of the first noble gas within the gas containment structure.

4. The broadband light source of claim 3, wherein the transmission edge shifts to larger wavelength as the partial pressure of the first noble gas is increased.

5. The broadband light source of claim 1, wherein the first noble gas comprises at least one of krypton or xenon.

6. The broadband light source of claim 1, wherein the second noble gas comprises argon.

7. The broadband light source of claim 1, wherein the filter tube is formed from at least one of a $CaF_2$ or sapphire filter.

8. The broadband light source of claim 1, wherein the first noble gas comprises krypton, the second noble gas comprises argon, and the filter tube is formed from $CaF_2$.

9. The broadband light source of claim 1, wherein the first noble gas comprises xenon, the second noble gas comprises argon, and the filter tube is formed from sapphire.

10. The broadband light source of claim 1, wherein the output optical window is formed from $MgF_2$.

11. The broadband light source of claim 1, further comprising:

a collection optical element configured to collect at least a portion of the broadband light emitted from the plasma and direct the portion of the broadband light to the one or more downstream optical elements.

12. The broadband light source of claim 11, wherein the collection optical element comprises at least one of a mirror or a lens.

13. The broadband light source of claim 11, wherein the one or more downstream optical elements are formed from $MgF_2$.

14. The broadband light source of claim 11, wherein the one or more downstream optical elements comprise at least one of one of one or more transmissive optical elements or one or more reflective optical elements.

15. The broadband light source of claim 14, wherein the one or more downstream optical elements comprise at least one of a window, a lens, or a mirror.

16. The broadband light source of claim 1, wherein one or more optical elements are positioned within the gas containment structure.

17. The broadband light source of claim 16, wherein at least one of a collection mirror or a collection lens are positioned within the gas containment structure.

18. A characterization system comprising:

a broadband light source comprising:

a gas containment structure containing a mixture of a first noble gas and a second noble gas;

a filter tube positioned within the gas containment structure;

an input optical window;

a laser pump source configured to generate an optical pump, wherein the laser pump source is configured to direct the optical pump through the input optical window to sustain a plasma within the filter tube, wherein the plasma generates broadband light;

wherein the first noble gas absorbs a portion of the broadband light within a first wavelength band and a second wavelength band;

wherein the filter tube is configured to absorb a portion of the broadband light having a wavelength below a selected wavelength threshold, wherein absorption of broadband light by the first noble gas and the filter tube provide long-pass filtering of broadband light below the selected wavelength to protect one or more downstream optical elements from damage;

an output optical window configured to transmit filtered broadband light out of the gas containment structure;

a gas inlet; and a gas outlet, wherein the gas inlet and gas outlet are configured to generate a reverse vortex flow pattern within the filter tube;

a set of illumination optics configured to direct filtered broadband light from the broadband light source to one or more samples;

a set of collection optics configured to collect light emanating from the one or more samples; and a detector assembly.

19. The characterization system of claim 18, wherein the absorption of broadband light at the first wavelength by the first noble gas protects the filter tube from degradation.

20. The characterization system of claim 18, wherein a transmission edge of the long-pass filtering is tunable via adjustment of a partial pressure of the first noble gas within the gas containment structure.

21. The characterization system of claim 20, wherein the transmission edge shifts to larger wavelength as the partial pressure of the first noble gas is increased.

22. The characterization system of claim 18, wherein the first noble gas comprises at least one of krypton or xenon.

23. The characterization system of claim 18, wherein the second noble gas comprises argon.

24. The characterization system of claim 18, wherein the filter tube is formed from at least one of a $CaF_2$ or sapphire filter.

25. The characterization system of claim 18, wherein the first noble gas comprises krypton, the second noble gas comprises argon, and the filter tube is formed from $CaF_2$.

26. The characterization system of claim 18, wherein the first noble gas comprises xenon, the second noble gas comprises argon, and the filter tube is formed from sapphire.

27. The characterization system of claim 18, wherein the output optical window is formed from $MgF_2$.

28. The characterization system of claim 18, further comprising:

a collection optical element configured to collect at least a portion of the broadband light emitted from the plasma and direct the portion of the broadband light to the one or more downstream optical elements.

29. The characterization system of claim 28, wherein the collection optical element comprises at least one of a mirror or a lens.

30. The characterization system of claim 28, wherein the one or more downstream optical elements are formed from $MgF_2$.

31. The characterization system of claim 28, wherein the one or more downstream optical elements comprise at least one of one of one or more transmissive optical elements or one or more reflective optical elements.

32. The characterization system of claim 31, wherein the one or more downstream optical elements comprise at least one of a window, a lens, or a mirror.

33. The characterization system of claim 18, wherein one or more optical elements are positioned within the gas containment structure.

34. The characterization system of claim 33, wherein at least one of a collection mirror or a collection lens are positioned within the gas containment structure.

35. A method of generating VUV broadband light comprising:

containing a mixture of a first noble gas and a second noble gas within a gas containment structure;

generating a reverse vortex flow pattern within a filter tube within the gas containment structure;

generating an optical pump and directing the optical pump through an input optical window of the gas containment structure into the filter tube of the gas containment structure to sustain a plasma within the filter tube of the gas containment structure to generate broadband light;

filtering the broadband light via the first noble gas and the filter tube to filter the broadband light having a wavelength below a selected wavelength threshold; and transmitting filtered broadband light out of the gas containment structure via an output optical window.

* * * * *